Figure 1:
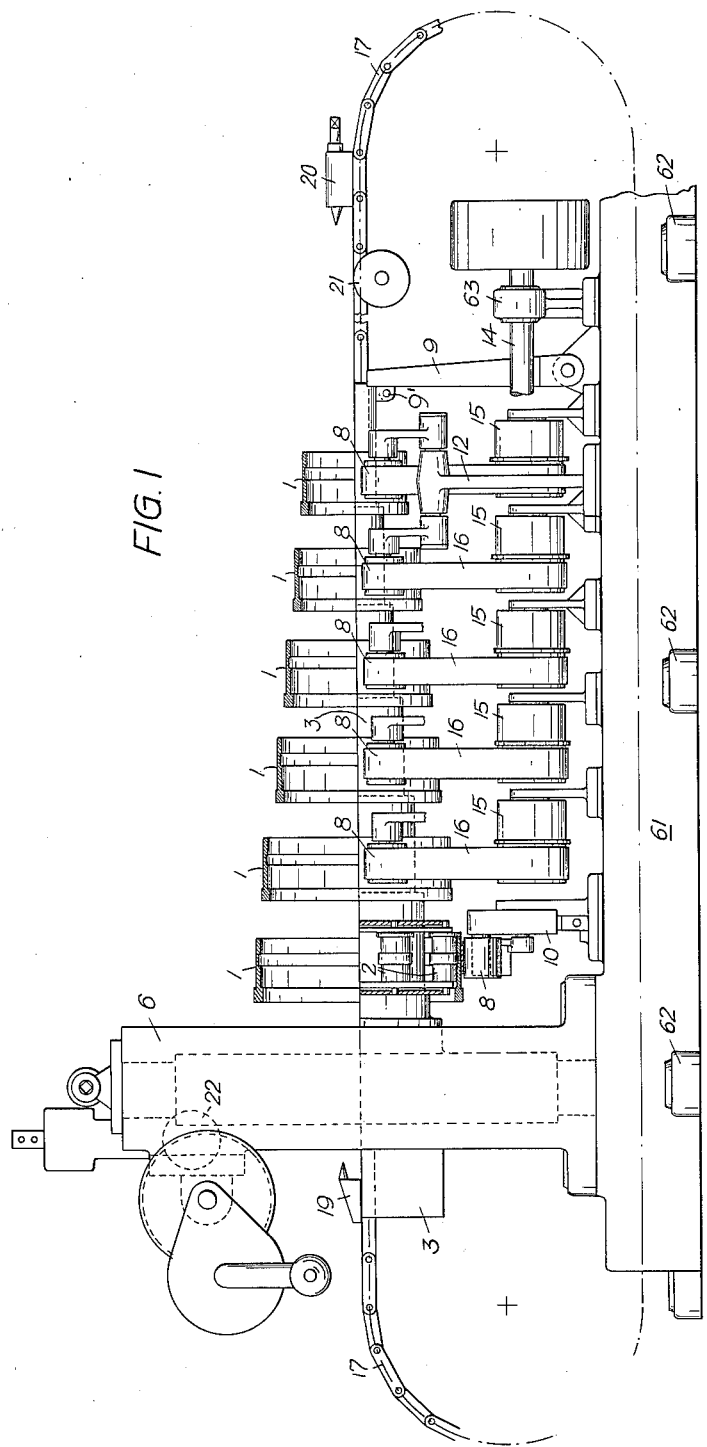

Aug. 31, 1965    W. WITSCHNIG    3,203,456
MACHINE FOR CUTTING UP ESSENTIALLY SEMI-CYLINDRICAL
BODIES TO SEMI-TUBULAR ELEMENTS
Filed June 11, 1962    8 Sheets-Sheet 1

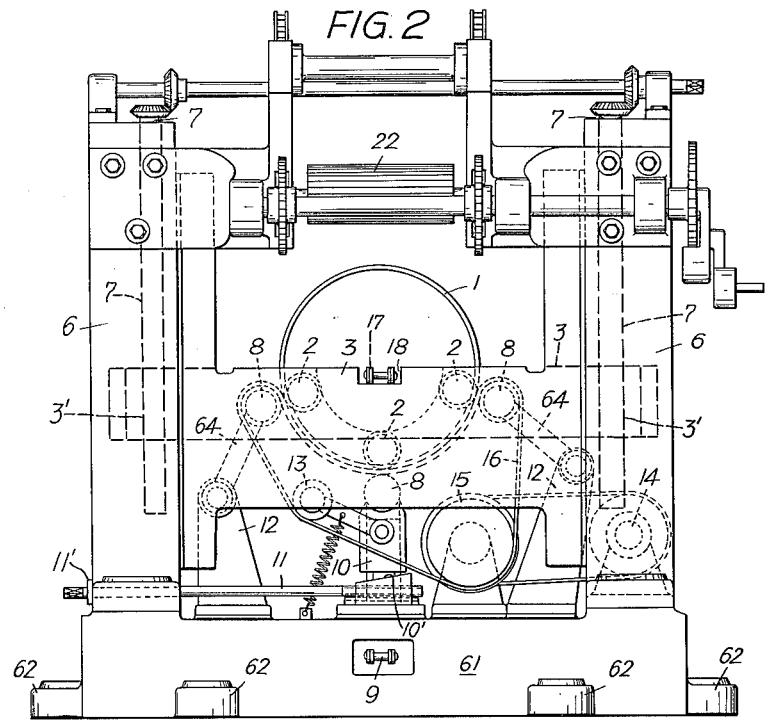
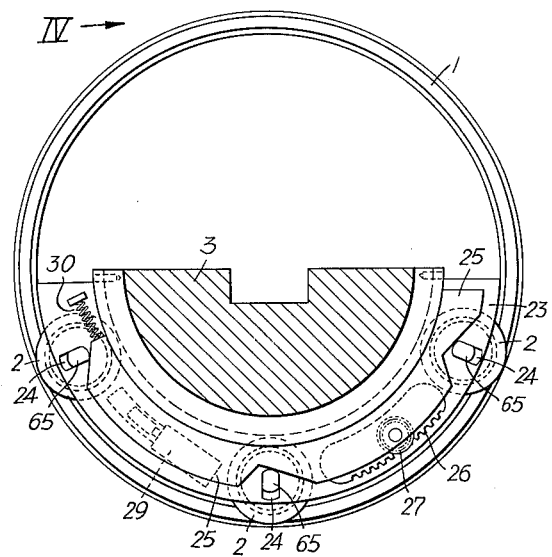
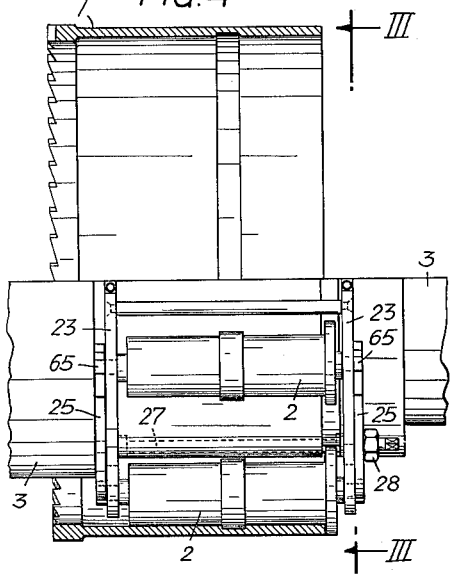

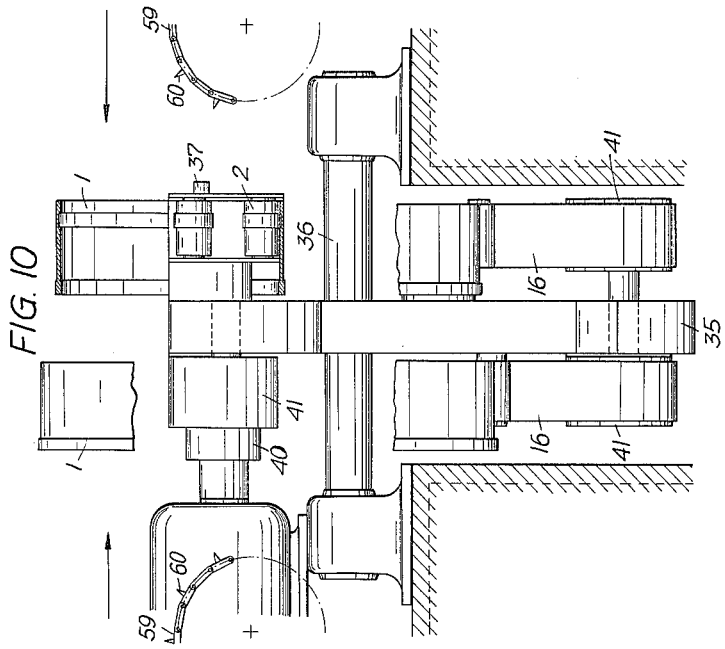
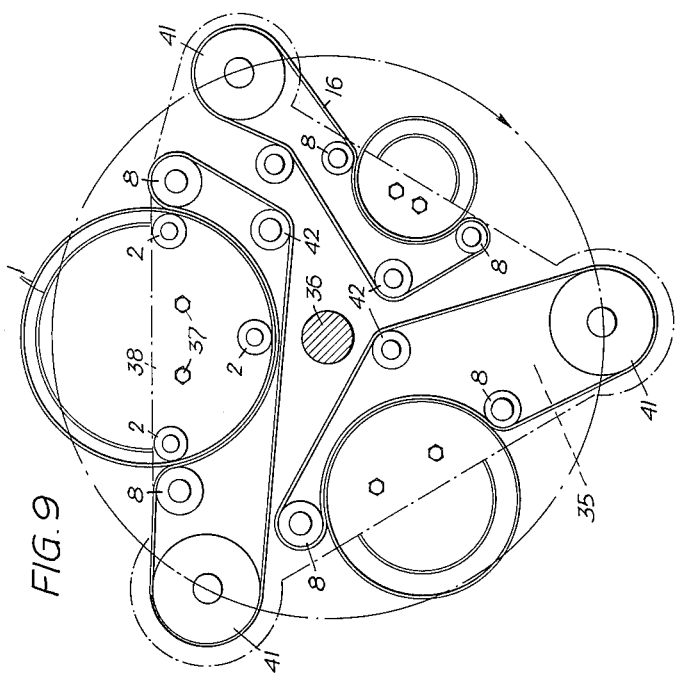

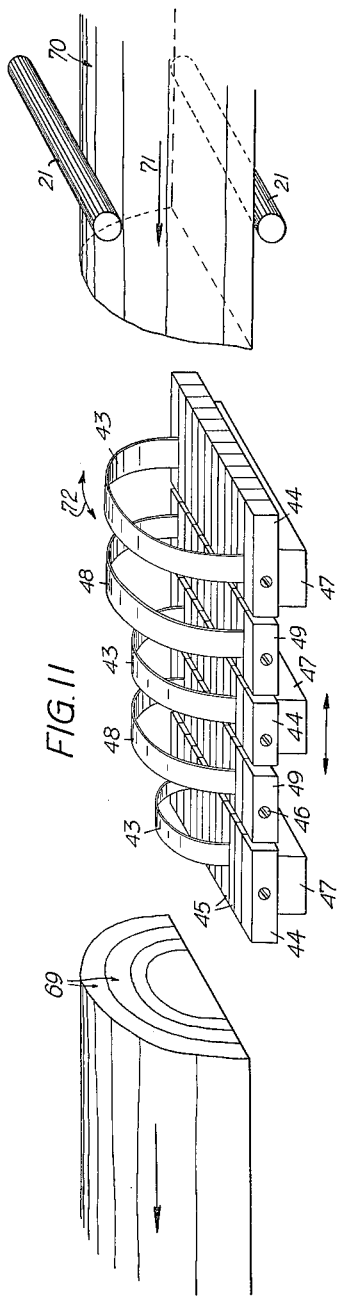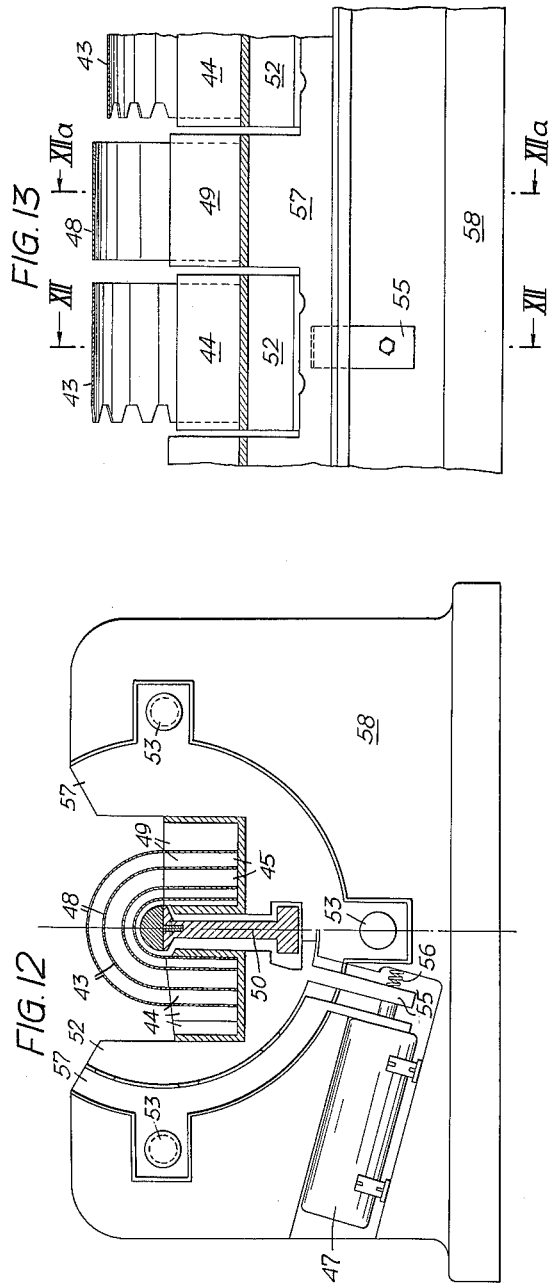

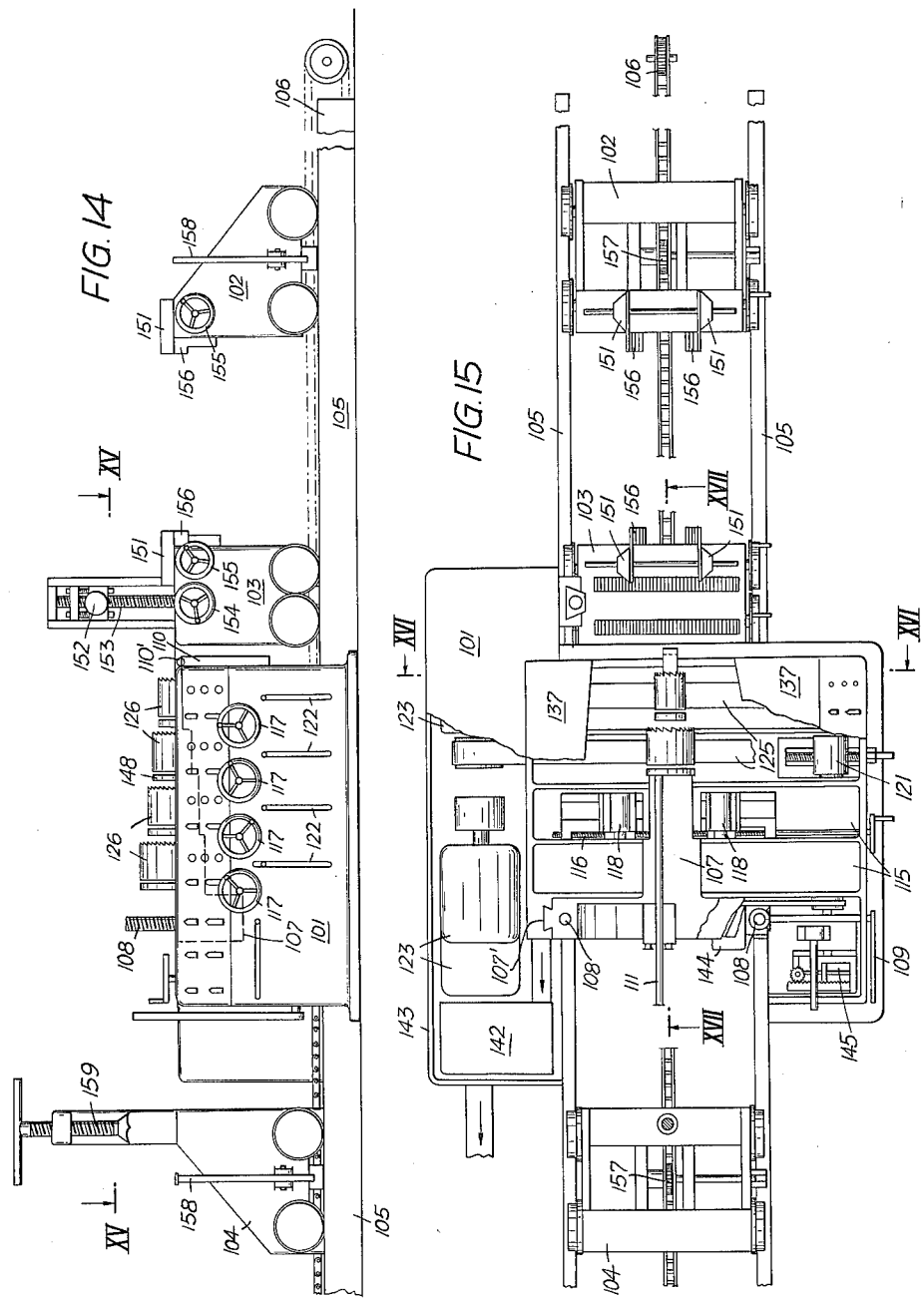

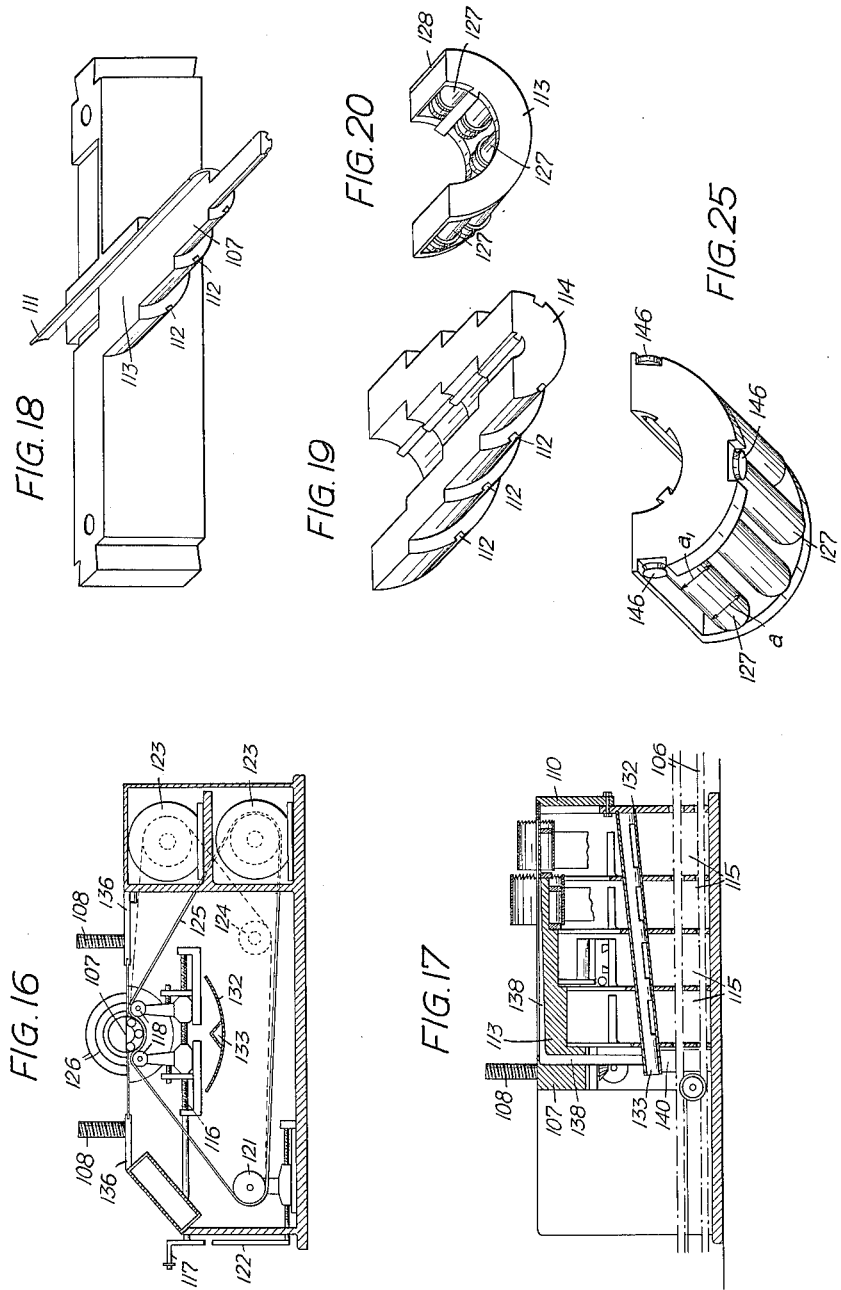

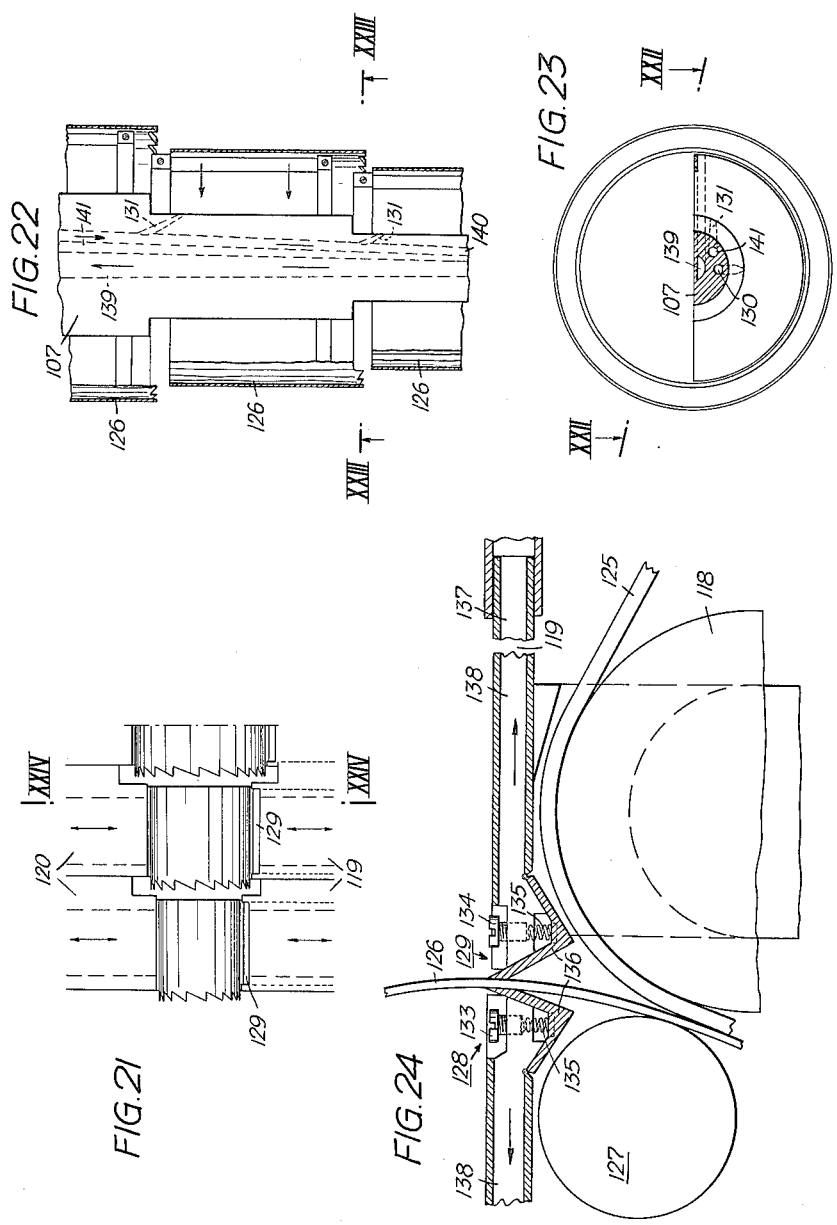

United States Patent Office 3,203,456
Patented Aug. 31, 1965

3,203,456
MACHINE FOR CUTTING UP ESSENTIALLY SEMI-CYLINDRICAL BODIES TO SEMI-TUBULAR ELEMENTS
Walter Witschnig, Metnitz, Karnten, Austria
Filed June 11, 1962, Ser. No. 201,673
Claims priority, application Austria, June 13, 1961,
A 4,568/61
24 Claims. (Cl. 143—85)

The present invention relates to means for cutting up substantially semi-cylindrical bodies into semi-tubular elements.

It is known to cut out individual elements from trunks of trees by means of cylinder saws, the cross section of said elements being that of a tube which has been bisected in the longitudinal direction. Such cylinder saws can for instance be used for producing cask staves. It has also been proposed to make the individual cuts along the annular rings of a trunk whereby kneading troughs or the like have been produced from a bisected trunk of tree by means of annular cutting tools of stepped diameters. In a case in which a tree trunk, which has been disected in the longitudinal direction, is to be cut up in one work cycle to a multitude of individual elements the boundary surfaces of which are curved in accordance with cylindrical surfaces or in other words, individual elements with semi-tubular cross sections, cylinder saws are used, about half of the circumference of which engages the trunk, with a multitude of such saws having stepped diameters being arranged one behind the other in a common machine frame.

The present invention relates to a machine of the above named type, which machine is characterized by a particularly simple construction and by the fact that it is able to cut out construction elements from logs of trees, the boundary surfaces of which elements are curved in accordance with cylinder surfaces, the cutting up being effected in a particularly economical manner and at the same time with high precision. The invention particularly relates to a machine by means of which it is possible to cut out individual elements of considerable length.

Such wooden elements, the boundary surfaces of which are curved in accordance with cylinder surfaces, or in other words, the cross section of which is of semi-tubular shape, show a great versatility in use as construction elements. Particularly in the case where the boundary surfaces of such semi-tubular wooden elements coincide with the annual rings of the trunk, such wooden elements show particular advantage. This results from the fact that the direction of the wood fibres is parallel to the boundary surfaces. Such wooden elements are particularly suited for the construction of roof and ceiling and for the production of load carrying walls and the like. Such wooden elements can easily be composed to form wave-shaped or tube-shaped profiles which are characterized by extremely high strength. Such wooden elements can also be used for the construction of heat and sound structures. On account of the particular manner of production of such wooden elements a great reduction of the material losses in cutting trunks is achieved and smooth surfaces are obtained which do not require any aftertreatment.

The present invention relates to a machine for cutting up essentially semi-cylindrical bodies e.g. logs of trees, which have been bisected in the direction, to individual semi-tubular elements, said machine being provided with cutting tools of stepped diameters which are arranged one behind the other. With such machine the invention essentially resides in the fact that the individual cutting tools are arranged on a common guide means carrier.

This feature affords a particularly simple construction and a longitudinal extension of the machine which is materially less than the longitudinal extension of any of the known machines of this type, there further existing the possibility of a quick and simple change of the cutting tools and the guide elements for the cutting tools and thus a quick and simple adjustability to different thicknesses of the individual elements.

For the purpose of exchangeability of the individual cutting tools, the arrangement is preferably made in such a manner that the guide means carrier can be lifted at least at one of its ends, with the lifting of the guide means carrier being preferably effected by means of a threaded spindle.

The individual cutting tools are preferably formed by cylinder saw blades or drum saw blades. In accordance with another embodiment the cutting tools can also be formed by splitting tools having either linear or toothed cutting edges.

In that embodiment in which the individual cutting tools are formed by cylinder saws which are driven by means of belts engaging part of the circumference of the saws, with outer guiding rollers securing the engagement of the belts on the cylinder saws, the arrangement is preferably such that those guiding rollers which are most remote from the axial central plane are carried by swinging arms the pivotal axes of which are located outside of the area enclosed by the belt so that said guide rollers are pulled towards the cylinder saw blade by the belt tension. The swinging arms are preferably provided with adjustable spring means.

In a preferred embodiment, the radial distance between the guiding roller which is located in the axial central plane and the rotational axis of the cylinder saw blade, is adjustable preferably in such a manner that the member carrying the guide roller is slidable in a vertical guide means and can be lifted or lowered by means of a horizontally movable wedge-shaped member. The wedge-shaped member can be moved by means of a threaded spindle and the extent of the movement or displacement of the guiding roller can be read from a scale.

The position of the guide roller is preferably adjustable in a direction radial to the centre of the saw, with the adjustment being effected by means of a threaded spindle, and adjustable spring element being preferably provided in addition thereto.

The individual cylinder saw blades are provided in a manner known per se by inner guiding means in addition to the outer guiding means and the arrangement is such that the inner guiding means for the individual cylinder saw blades is formed by a multitude of radially adjustable guiding rollers. For the purpose of adjusting said guiding rollers, cam elements can be provided which are formed with cam surfaces in the region of the bearing pins of the guide rollers, by means of which cam surfaces they force the bearing pins of the giude rollers, which are slidable in radial slots, in outward direction.

For the rotational displacement of the cam elements there is preferably provided a pinion which engages a toothed rim of the cam elements, with the pinion being fixed by means of a nut or such displacement may be effected by hydraulic means, e.g. a pressure cylinder and a piston connected therewith as well as return springs.

The inner guiding means for the cylinder saw blades can also be formed by slide blocks which may be moved by hydraulic devices such as an oil-loaded cylinder, in a radial direction. In this case, provision for the lubrication of the slide blocks is made in such a manner that the piston of the hydraulic device is provided with a bore which extends through the slide block to the surface of contact with the saw blade.

In accordance with a further embodiment of the present machine, the inner guide means of the individual cylinder saw blades may be formed by slip rings which extend substantially along a semi-circle and which can be placed onto the guide means carrier with the thickness of said slip rings being chosen according to requirements.

A particularly advantageous embodiment of the present machine is characterized by the fact that the guide means carrier is subdivided into a plurality of individual members, each of said members comprising two cutting steps, and being removably connected to a rotatable carrying disk in a turret-like manner. This feature provides for a particularly quick and simple adjustability to different thicknesses of the individual wooden elements to be cut, and to different diameters of the trunks.

As has already been mentioned, the cutting tools may also be formed by split knives which are arranged on a common carrier. In such embodiment, the carrier is preferably formed by individual, exchangeable blocks the thickness of which conforms to the usual steps in the wall thickness of the wooden elements to be produced, said individual blocks holding the ends of the split knives under the action of clamping means.

In the case where the cutting tools are formed by splitting knives, the arrangement is such that the carrier is made to perform rotary oscillation and/or axial oscillations, with said oscillations being effected by devices known per se.

With the embodiment in which the cutting tools are formed by splitting knives, it has been found to be desirable to arrange behind each of said splitting knives a kerf-filling element which is curved in the same manner as the respective splitting knife and which fills out the kerf produced by the cut and maintains the distance between the individual wooden elements. The filling elements may be fixed in the same manner as the splitting knives. The arrangement may be such that only the splitting knives perform oscillatory movements with the filling elements being stationary.

Further embodiments and details of the machine according to the present invention relate to the feeding of the trunks to be cut up, to devices for cleaning the cylinder saw blades and to suction devices for removing the saw dust and the chips.

In the drawings there are shown various embodiments of the present invention.

Figure 5:
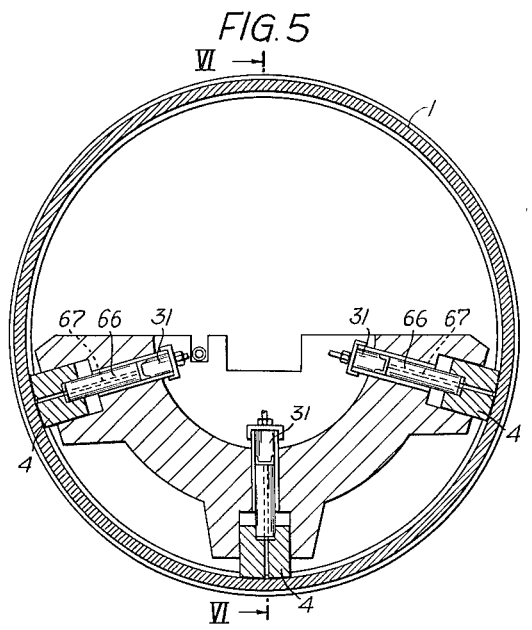
Figure 6:
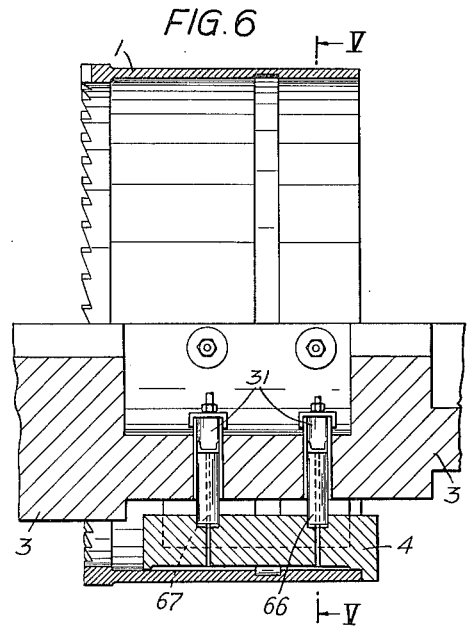
Figure 7:
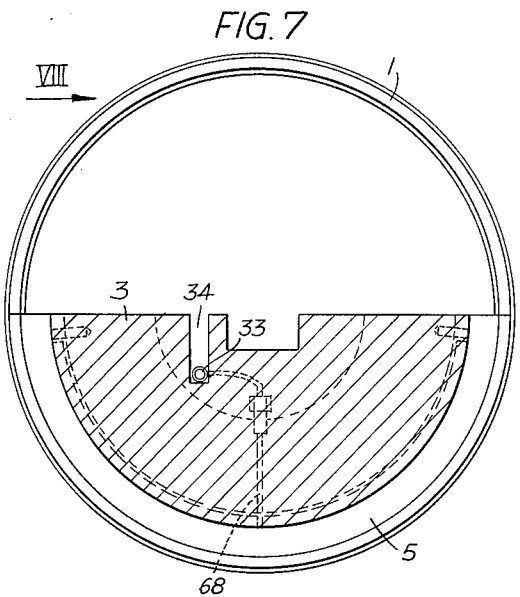
Figure 8:
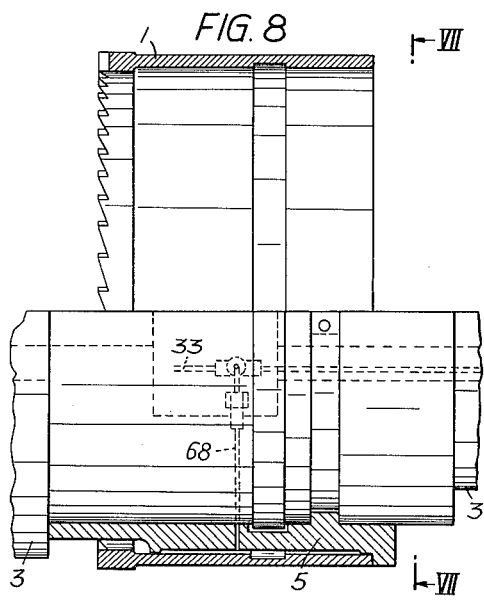

FIG. 1 of the drawings is an elevation partly in section of one embodiment of the machine according to the present invention, FIG. 2 shows the same machine from that side from which the trunks are fed into the machine. FIGS. 3 to 8 show details of the guiding means for a cylinder saw blade, FIG. 3 is a section taken along line III—III of FIG. 4, FIG. 4 is a side view of a part of the carrier member seen in the direction of the arrow IV in FIG. 3, with the saw blade being in section, FIG. 5 being a section taken along line V—V of FIG. 6, FIG. 6 is a section taken along line VI—VI of FIG. 5 and FIG. 7 is a section taken along line VII—VII of FIG. 8. FIG. 8 is a side view of the carrier member, seen in the direction of the arrow VIII in FIG. 7, with the saw blade being in section. FIGS. 9 and 10 are views in front elevation and side elevation, respectively, of an embodiment in which the cutting tools are arranged on a rotatable carrying disk in a turret-like manner. FIGS. 11 to 13 show an embodiment of a machine in which the cutting tools are formed by split knives, the left half of FIG. 12 being a section taken along line XII—XII of FIG. 13 and the right half of FIG. 12 being a section taken along line XIIa—XIIa of FIG. 13. FIG. 14 is a side elevation of a further embodiment of a machine according to the present invention as viewed from the operation side of the machine. FIG. 15 is a section taken along line XV—XV of FIG. 14. FIG. 16 is a section taken along line XVI—XVI of FIG. 15 showing the drive mechanism for a cylinder saw blade. FIG. 17 is a partial section along line XVII—XVII of FIG. 15, viz. a longitudinal section through the axis of the machine. FIGS. 18, 19 and 20 are diagrammatic views of a guide means carrier with additional carrier and roller guiding means. FIG. 21 is a partial view of the cylinder saws as viewed from above. FIG. 22 is a section taken along line XXII—XXII of FIG. 23 and FIG. 23 is a section taken along line XXIII—XXIII of FIG. 22, the figures showing the inner cleaning devices for the saw blade. FIG. 24 is a section taken along line XXIV—XXIV of FIG. 21 the figure showing the outer and the inner cleaning devices for a saw blade. FIG. 25 is a diagrammatic view of an embodiment of a roller guide means for a cylinder saw blade.

In the embodiment of a machine shown in FIGS. 1 and 2, the individual cutting tools are formed by cylinder saw blades which are arranged one behind the other, the diameters of said saw blades increasing or decreasing, respectively, from one end of the machine to the other. The machine comprises a foundation plate 61 which is anchored to the ground by means of foundation bolts 62 or the like. At one end of the foundation plate 61, there is provided a vertically extending yoke-like structure or frame 6. The numeral 2 designates inner guide members, viz. guide rollers, for the cylinder saw blades 1. All of these inner guide rollers 2 are arranged on a common carrier member 3 which is vertically adjustable in the frame 6 situated at the feed end of the machine. This vertical adjustment of the carrier member 3 can be effected by threaded spindles 7 (FIG. 2), which are located in the frame 6 and extend through threaded bores 3' in the carrier member. Prior to the adjustment of the carrier member 3, a support 9 (FIG. 1) which is articulated to the foundation plate 61 has to be tilted away after a connection 9' between support 9 and the end of the carrier member 3 remote from the frame 6 has been removed. After lifting the carrier member 3 by turning the threaded spindles 7, the saw blades 1 and the inner guide rollers 2 are disengaged from endless belts 16 and outer guide rollers 8, whereby the saw blades 1 and rollers 2 may be easily and readily exchanged.

The arrangement of the outer guide rollers 8 is the same as that of the inner guide rollers which will be more specifically described below. Said outer guide rollers 8 are arranged so that one of said rollers is positioned at the right and one at the left of the vertical centre plane of the device, another one of said rollers being arranged below the saw blade axis.

The saw blades are driven by means of the endless belts 16 each of which extends over a return pulley 15 which is again driven by a main drive shaft 14 which is common to all saw blades one of the bearings of said main shaft being designated with the numeral 63.

As is specifically shown by FIG. 2, the upper course of each cylinder saw blade 1 extends freely through an angle of about 180 degrees, with only the lower semi-circular course serving for bearing and guiding the saw blade and for the power transmission from the belt 16 to the external surface of the saw blade. Close engagement of the driving belt 16 with the external surface of the saw blade is thus of particular importance and to achieve such close engagement, guide rollers 8 are provided at the left and at the right of the axis of rotation of the saw blade. The guide rollers 8 are carried by arms 64 which are pivoted at foundations 12, with the pivotal axis being positioned outside the course of the belt 16. This arrangement assures that the lateral guide rollers 8 will be forced against the saw blades by the belt tension. A tension roller 13 which is subject to spring action assures the proper tension of the belt 16 even in the case of variations of the belt length. The belt 16 may be formed either by a flat or by one or more V-belts.

The guide roller 8 which is located below the axis of rotation to the saw blade 1 is vertically adjustable in order to provide for an adjustment to the respective and required diameter of the saw blade. This adjustment may be effected in such a manner that member 10 which carries the central guide roller 8 is slidable in a guiding structure wherein it can be raised and lowered by means of a wedge member 10′ actuated by a threaded spindle 11 the extent of the displacement being shown on a graduated scale 11′ which is positioned on the frame.

As has already been mentioned, the individual wooden elements are cut by the present machine from semi-cylindrical bodies, such as logs which have been bisected in the longitudinal direction. Feeding of such bisected logs into the machine is effected in a simple manner by means of a chain or rope mechanism 17, the upper horizontally extending course of which is guided in the longitudinal central plane of the guide carrier member 3 in a groove 18 provided therein. The external surface of the chain or rope mechanism 17 is provided with engaging dogs 19, 20 (FIG. 1) one of which, vis. the engaging dog 20, is equipped with adjustable clamping means. The bisected trunk is furthermore guided by rollers 21 outside of the cutting range. For a further guiding of the bisected trunk, a load roller 22 may be provided at the feed end of the machine on the frame 6 in a manner common to frame saws.

In order to avoid opening of the chain or rope mechanism during the exchange of the saw blades, the feed device may be formed by two separate chain or rope mechanisms 59 as is shown in FIG. 10. It is also possible to provide the individual chain members with spikes 60 instead of engaging dogs.

In order to adjust the inner guide members to the required diameter of the cylinder saw blade, the guide members are adjustable in the radial direction.

One embodiment for such adjustment is shown in FIGS. 3 and 4. The bearing pins 65 of the guide rollers 2 are slidable in radial slots 24 of semi-circular rings 23. There are furthermore provided semi-circular rings 25 which are formed with cam surfaces which may be rotatably displaced in relation to the semi-circular rings 23, with the cam surfaces, of the rings 25 being provided in the vicinity of the bearing pins 65. By means of the cam surfaces the bearing pins 65 are displaced in the radial direction. The rotational displacement of the rings 25 can be effected by means of a pinion 27 which is carried by the rings 23 and which engages with a toothed rim 26. Such arrangement is shown in the right half of FIG. 3 and in FIG. 4. The pinion 27 can be fixed by means of a nut 28.

A further possibility for the rotational displacement of the rings 25 is shown in the left half of FIG. 3. In this embodiment, there is provided a pressure cylinder 29 in which the rotational displacement is effected by means of a pressure medium acting in a pressure cylinder 29 against the action of a return spring 30. Instead of rollers 2, the inner guide means for the cylinder saw blade may be defined by slide blocks 4 as shown in FIGS. 5 and 6. Each of said slide blocks 4 is provided with two hydraulic cylinders 31, pistons 66 of which are each formed with a bore 67 which extends through the slide block 4 and which serves for feeding lubricant to the slide block. The lubricant may be but does not have to be the same fluid as the hydraulic fluid in the cylinder 31.

In a further embodiment of the inner guide means for the cylinder saw blades shown in FIGS. 7 and 8, the saw blade 1 is in sliding engagement with a semi-circular member 5 which is removable from the guide carrier number 3. For the purpose of adjustment to the respective and required diameter of the cylinder saw blade, semi-circular members or slip rings 5 of different thickness are provided which slip rings can be fixed on the guide carrier member 3. In this case too, friction between the slip ring 5 and the saw blade 1 is reduced by a pressure lubricating system, the lubricant being fed through a passage 33 located in a longitudinal groove 34 of the guide carrier member 3. Lubricant ducts 68 extend from said passage 33 in the radial direction.

In order to provide for improved guiding and for taking up axial stresses, the inside of the saw blade 1 is provided in a manner known per se with a groove with which the guide rollers 2 engage each by means of a flange, and the slide blocks 4 or the slip ring 5 by means of a flange or the like. For the same purpose, the inner guide members are provided with an additional flange or the like which coacts with the back of the saw blade. Structures of this type are known per se, particularly for guiding band saw blades.

It is, of course, also possible to provide lubricating devices for the embodiment in which the inner guide means for the saw blades are defined by rollers.

It is further possible to provide lubricating devices for the embodiment in which the inner guide means for the saw blades are defined by slide blocks. In all of these situations, the lubricating oil not only has the function of a lubricant but also serves for cleaning the saw blades. Hence, the adhering of saw dust to the blades is prevented.

A further embodiment of the present machine is shown in FIGS. 9 and 10. In this embodiment, the guide carrier member, which in FIGS. 1 and 2 comprises a multitude of cutting steps arranged one behind the other, is subdivided in such a manner that each of such subdivision preferably comprises only two cutting steps, with the subdivision being arranged on a rotatable carrying disk 35 in a turret-like manner. Furthermore, the feed device of this embodiment is preferably reversable, and loading devices are provided at both sides of the carrying disk 35. It is thus possible to first pass the bisected trunk through the first cutting step whereupon the cut out semi-tubular wooden elements are removed, and then turn the carrying disk 35 until the subsequent smaller cutting step holds the position of the third cutting step whereupon semi-tubular wooden elements are cut out with reverse drive and the following cutting step is performed. With such procedure, the cutting directions of the individual cutting steps must of course alternate. By means of the machine shown in FIGS. 9 and 10, it is possible to cut up a bisected trunk into individual semi-tubular wooden elements in the course of three passages. In the case of a trunk of relatively small diameter, two passages or even one passage may suffice.

In this embodiment, guide means as shown in FIGS. 3 to 8 are removably connected by means of bolts 37 or the like, to a carrying disk 35 which is rotatable about an axis 36. The guide rollers 8 are carried by the carrying disk 35 by means of a carriage and the guide rollers 8 can be adjusted by means of a threaded spindle to obtain an adjustment to the respective saw-blade diameter. In order to achieve uniform pressure and close engagement with the guide rollers 8, the guide rollers 8 are tiltably pivoted to guide carriages under adjustable spring action.

The chosen cutting step designated with the numeral 38 in FIG. 9 is brought into cutting position by turning the disk 35 and fixed in this position by fixing means which are not shown in the drawing, whereupon motor 39 (FIG. 10) is connected to pulley 41 by a coupling means 40. Also, in this case, the drive of the individual saw-blades is effected by means of the belts 16 as was the case in the first embodiment.

The embodiment of FIGS. 9 and 10 has the advantage that the length of the machine is reduced considerably. Furthermore, it is possible with this embodiment to effect the exchange of saw blades, the adjustment of guide rollers and the like at those cutting steps which are not operating.

A further embodiment of the machine is shown in FIGS. 11 to 13 wherein the cutting tools are defined by splitting knives. The guide carrier member 44 consists of individual blocks 45 which are clamped together by means of screws 46, the splitting knives 43 which are bent to semicircle are fixed between such blocks 45. The thickness of the individual blocks 45 suitably coresponds to the thickness steps of individual semitubular wooden elements 69 produced with this machine. The bisected trunk 70 from which the individual elements 69 are cut is fed into the machine by means of feeding rollers 21 in the direction of the arrow 71 against the splitting knife 43. The knives 43 are oscillated in a manner known per se by oscillating means 47 which are connected with the guide carrier member 44, the oscillations being rotational oscillations in the direction of the double arrow 72 and/or axial oscillations in the direction of the double arrow 73. The oscillatory movement of the splitting knives improves the splitting action of these knives and reduces the force necessary for the relative movement between the knife and the trunk. In the case where the guide carrier member 44 is oscillated in the direction of the double arrow 73 only, the arrangement can be such that the upper surface of this guide carrier member serves at the same time as the base plate for the trunk 70.

In order to further improve the splitting action of the splitting knives 43 and particularly the guiding of the trunk to be cut up, kerf filling elements 48 may be provided behind each of the splitting knives 43, with the curvature of said filling elements being identical to the curvature of the respective splitting knives. The filling elements 48 are fixed in the same manner as the splitting knives 43, and it is not necessary that the filling elements oscillate together with the splitting knives 43.

The cutting edge of the splitting knives 43 can be either linear, wave-shaped or tooth-shaped as is shown in FIG. 13. If no curve filling elements 48 are used, it is suitable to use splitting knives, the cross-section of which is slightly wedge-shaped. With the splitting knives shown in FIGS. 12 and 13, the half trunk rests on a carrier 50 (FIG. 12) and is clamped down by means of claws in the range of the core of the trunk. Clamping devices 44 and 49 are arranged in a cylindrical body 52 which is carried by a cylindrical guide body 57. Oscillators 47 (FIG. 11) impart rotational oscillations to the body 52 through the nose 52 and in coaction with the spring 56 (FIG. 12). In the case where it is desired to impart to the body 52 also an axial oscillation provision must be made to allow the body 52 to move in the longitudinal direction within the guide body 57. It is possible that the trunk together with the carrier 50 and the body 52 is stationary in machine frame 58 in which case the splitting tools are moved together with their fixing devices, the body 52 and the guide body 57 in a direction along the longitudinal axis of the trunk, such as by means of threaded spindles 53 or by hydraulic means.

Much simpler, however, is an arrangement wherein the trunk together with the carrier and fixing devices is moved, as in this case, the guide body 57 and the spindles 53 are not necessary.

The oscillators can be driven in a manner known per se either hydraulically, electromagnetically or the like. The use of kerf filling elements 48 is not restricted to a cutting machine in which the cutting tools are defined by splitting knives, but they can also be used in the same effect with a machine in which the cutting tools are defined by cylinder saws. Furthermore, for the improvement of the guiding of the trunk, it is not required that the kerf filling elements extend through a semi-circle. It is sufficient when these filling elements extend from the carrier through a small angle into the kerf and thus avoid the lateral deviation of the trunk from the direction of feeding.

FIGS. 14 to 25 show further embodiments and details of the machine according to the present invention.

The machine in FIGS. 14 and 15 comprises a cutting part proper 101 with a plurality of cutting steps, cylinder saw blades, feed trucks 102 and 103, delivery truck 104, guide tracks 105 and an endless feed chain 106. The carrier member 107 is again guided in the machine frame and can be raised by means of threaded spindles 108 after removing the connection between the end of the carrier member 107 and a tiltable support as has been described with respect to FIGS. 1 and 2. Arranged on the carrier member 107 (FIG. 18) there is an adjustable kerf guide ledge 111 (FIGS. 15 and 18). In the carrier member 107 (FIG. 18) there are grooves 112 for guide members 113 (FIG. 20) and 114 (FIG. 19), respectively, or for additional guide members 114. The machine frame 101 is subdivided in compartments 115 to receive the individual drive means for the saw blades. The saw blade drive consists of guide rollers 118 (FIG. 16) which are adjustable by means of threaded spindles 116 and a hand wheel 117 for each spindle. When operating each threaded spindle 116, belt protecting plates 119 and 120 are displaced at the same time. The saw blade drive comprises a belt tension roller 121 with an operating lever 122, a drive motor 123 and a return roller 124. The belt 125 which is a flat type belt is pressed towards cylinder saw blade 126 by pressure rollers and guide rollers 118 (FIGS. 15 and 16) in order to improve the friction.

The removal of the saw dust and the chips as well as the cleaning of the saw blades can be effected either by an inner 128 or an outer 129 blade stripping device (FIG. 24) with suction device connected thereto or only with an outer blade stripping device 129 together with an inner feed system 130 for feeding oil (FIG. 23), e.g. diesel oil or mineral oil to avoid sticking of the saw dust and of resin. A feed system 131 for compressed air is also provided for blowing out the saw dust. In both embodiments, the removal of the greater part of the chips and saw dust is effected by a trough 132 (FIG. 17) which is removable to allow for the exchange of belts. Connected with this trough 132 is a channel 133 provided with suction slots.

The outer blade cleaning device 129 (FIG. 24) comprises an adjusting screw 134 with a spring 135 and a stripping means 136, and the same is removable from machine plate 137. The belt covering plate as well as the machine plate are provided with suction channels 138.

The inner blade cleaning device 128 with the stripping and suction device is identical to the outer cleaning device, and the inner cleaning device together with the respective suction channel 138 is mounted on the guide member 113 (FIG. 17). In accordance with another embodiment of the inner blade cleaning device, diesel oil or the like is fed to the internal surface of the cylinder blade 126 through a channel 130 (FIG. 23), with compressed air being at the same time fed through main channel 141 and through side channel 131 provided in the carrier member 107. The exhauster 142 is housed in motor chamber 143 (FIG. 15). The feed chain 106 is driven by a motor 144 through a gear train (not shown).

The saw blade guide system can either correspond to that shown in FIG. 20 (guide rollers 127) or can be equipped with tapered guide rollers and guide rollers 146 for guiding the back of the saw blade in accordance with FIG. 25.

The bisected trunk which rests on the feed trucks 102 and 103 is adjusted to the longitudinal axis of the machine by means of a clamping and centering device 151. Upon centering clamping and centering device 151 (FIGS. 14 and 15) of the feed truck 103 is released and load is applied by means of spring loaded pressure roller 152 over a spindle 153 and an operating wheel 154. The clamping and centering device 151 is operated by a change-over spindle by means of operating wheel 155.

The feed truck 102 as well as the delivery truck 104 are moved by a chain 106 upon fixing of gear 157 by operating lever 158. On the delivery truck 104 the log is fixed by means of a spindle 159.

The invention is not to be confined to any strict conformity to the showings in the drawings, but changes or modifications may be made therein so long as such changes or modifications mark no material departure from the spirit and scope of the appended claims.

What I claim is:

1. A machine for cutting substantially semi-cylindrical wooden bodies into individual semi-tubular elements, comprising a frame, a set of cutting tools, each of said cutting tools being defined by a unidirectional driven cylindrical saw blade with approximately one-half of the diameter of the blade being adapted to engage the wooden body to be cut, said saw blades having stepped diameters and arranged one behind the other viewed in the direction of travel of the wooden body to be cut, a common carrier member extending in the direction of travel of the wooden body and being stepped corresponding to the stepped diameters of the saw blades, intermediate friction reducing guide means supporting said saw blades on said common carrier member, means for raising at least one end of said common carrier member for allowing the removal and exchange of said saw blades, drive means for said cylindrical saw blades including belts engaging only the lower portion of the circumference of said saw blades, outer guide rollers for the belts and for pressing said saw blades against said intermediate friction reducing guide means, swinging arms for the guide rollers most remote from the vertical symmetrical plane of said saw blades, the pivotal axes of said arms being outside of the areas inclosed by said belts whereby said rollers are urged toward said saw blades by the belt tension, a lower outer guide roller in the vertical symmetrical plane of the saw blades with its axis being parallel to the common axis of the saw blades, supporting means for said lower outer guide roller whereby the distance between the axis of such guide roller and the common axis of the saw blades can be adjusted, a vertical guide member in which said supporting means is slidably arranged, a wedge member cooperable therewith for raising and lowering the supporting means, a threaded spindle cooperable with said wedge member for moving the same horizontally, and a graduated scale associated therewith for indicating the extent of displacement of said lower outer guide roller.

2. A machine for cutting substantially semi-cylindrical wooden bodies into individual semi-tubular elements, comprising a frame, a set of cutting tools, each of said cutting tools being defined by a unidirectional driven cylindrical saw blade with approximately one-half of the diameter of the blade being adapted to engage the wooden body to be cut, said saw blades having stepped diameters and arranged one behind the other viewed in the direction of travel of the wooden body to be cut, a common carrier member extending in the direction of travel of the wooden body and being stepped corresponding to the stepped diameters of the saw blades, intermediate friction reducing guide means supporting said saw blades on said common carrier member, said intermediate friction reducing guide means being defined by at least three radially adjustable inner guide rollers, bearing pins for said guide rollers, means having radial slots for receiving said bearing pins, curved cam members for the common adjustment of said guide rollers, said cam members having camming surfaces in the area of said bearing pins for radially displacing the bearing pins in said slots, and means for rotating the cam members for effecting such displacement and means for raising at least one end of said common carrier member for allowing the removal and exchange of said saw blades.

3. The machine as claimed in claim 2, including a pinion for each cylindrical saw blade, a toothed rim on each cam member with which the pinion meshes for turning the cam members and locking means therefor.

4. A machine for cutting substantially semi-cylindrical wooden bodies into individual semi-tubular elements, comprising a frame, a set of cutting tools, each of said cutting tools being defined by a unidirectional driven cylindrical saw blade with approximately one-half of the diameter of the blade being adapted to engage the wooden body to be cut, said saw blades having stepped diameters and arranged one behind the other viewed in the direction of travel of the wooden body to be cut, a common carrier member extending in the direction of travel of the wooden body and being stepped corresponding to the stepped diameters of the saw blades, intermediate friction reducing guide means supporting said saw blades on said common carrier member, said intermediate friction reducing guide means being defined by at least three radially adjustable inner guide rollers, bearing pins for said guide rollers, means having radial slots for receiving said bearing pins, curved cam members for the common adjustment of said guide rollers, said cam members having camming surfaces in the area of said bearing pins for radially displacing the bearing pins in said slots, hydraulic means for rotating the cam members for effecting such displacement, and return spring means operably associated with said hydraulic means and means for raising at least one end of said common carrier member for allowing the removal and exchange of said saw blades.

5. A machine for cutting substantially semi-cylindrical wooden bodies into individual semi-tubular elements, comprising a frame, a set of cutting tools, each of said cutting tools being defined by a unidirectional driven cylindrical saw blade with approximately one-half of the diameter of the blade being adapted to engage the wooden body to be cut, said saw blades having stepped diameters and arranged one behind the other viewed in the direction of travel of the wooden body to be cut, a common carrier member extending in the direction of travel of the wooden body and being stepped corresponding to the stepped diameters of the saw blades, intermediate friction reducing guide means supporting said saw blades on said common carrier member, said intermediate friction reducing guide means being defined by inner slide blocks, and hydraulic means operably coupled thereto for adjusting said blocks radially and means for raising at least one end of said common carrier member for allowing the removal and exchange of said saw blades.

6. The machine as claimed in claim 5, in which said hydraulic means includes cylinders and pistons, said pistons and slide blocks having bores therein, with the bores of the slide blocks extending to their area of contact with the inner surface of the cylindrical saw blades, and means connecting such bores with a source of lubricant.

7. A machine for cutting substantially semi-cylindrical wooden bodies into individual semi-tubular elements comprising a frame, a set of cutting tools, each of said cutting tools being curved on its cutting edge along an arc of a circle and being defined by a splitting knife, said splitting knives having stepped diameters and arranged one behind the other viewed in the direction of travel of the wooden body to be cut, a common carrier extending in the direction of travel of the wooden body, said common carrier including a plurality of exchangeable inner blocks arranged according to the stepped diameters of the splitting knives, outer blocks similar to said inner blocks, all of said outer and inner blocks being arranged in a common plane with the thickness of said outer blocks conforming to the thickness steps of the semi-tubular element to be produced, means clamping the outer blocks to the inner blocks for holding the ends of the splitting knives, a common trough in which all of said outer and inner blocks are arranged, and oscillator means associated with said trough for imparting oscillating movements to the trough and thus to the splitting knives.

8. The machine as claimed in claim 7, in which said oscillator means imparts rotational oscillations to the trough and splitting knives.

9. The machine as claimed in claim 7, in which said oscillator means imparts axial oscillations to the trough and splitting knives.

10. The machine as claimed in claim 7, in which said oscillator means imparts axial and rotational oscillations to the trough and splitting knives.

11. The machine as claimed in claim 7, including an identically curved kerf filling element arranged behind each splitting knife.

12. The machine as claimed in claim 11, in which each kerf filling element is fixed to the carrier member in the same manner as each splitting knife.

13. The machine as claimed in claim 12, in which each kerf filling element is stationary with the oscillations being imparted only to the splitting knives.

14. The machine as claimed in claim 7, including hydraulic means for effecting relative axial movement of the wooden body with respect to the splitting knives.

15. The machine as claimed in clam 7, including threaded spindles for effecting relative axial movement of the wooden body with respect to the splitting knives.

16. A machine for cutting substantially semi-cylindrical wooden bodies into individual semi-tubular elements, comprising a frame, means for moving the wooden body to be cut in the direction of its longitudinal axis, a set of hollow cylindrical saw blades having teeth, the teeth of each saw blade being arranged along a circle and viewed in the direction opposite to the direction in which the wooden body to be cut is moved, approximately one-half of the diameter of each saw blade is adapted to engage the wooden body to be cut, said saw blades having stepped diameters and arranged one behind the other viewed in the direction of movement of the wooden body to be cut, supporting means stepped corresponding to the stepped diameters of the saw blades arranged within the interior of said hollow cylindrical saw blades to support said saw blades in operation of the machine against movement in a direction perpendicular to the direction of the longitudinal axis of the wooden body to be cut, a belt for imparting unidirectional rotating movement to each of said saw blades, each of said belts engaging only the lower circumference of the corresponding saw blade, friction reducing guide means arranged between the inner cylindrical surface of each saw blade and the outer surface of the corresponding supporting means, spring loaded means for pressing said saw blades against said friction reducing guide means and for pressing said belts against the circumference of the saw blades, means for lifting each of said supporting means to facilitate exchange of said saw blades, means for guiding the wooden body, said last named means being defined by at least one stationary element shaped along an arc of a circle, the radius of said arc corresponding to the kerf cut by one of said saw blades, said element entering said kerf in operation of the machine, a saw blade cleaning device for each saw blade resiliently engaging the inner circumference of said saw blade, and said saw blade cleaning device being arranged behind the cutting portion of the saw blade and before said friction reducing guide means, viewed in the direction of rotation of the saw blade.

17. The machine as claimed in claim 16, including a pressure lubrication system, said system comprising means providing radial passages in said supporting means, a common main lubricant duct, the passages of all of said supporting means being connected to the common main lubricant duct and adapted to feed lubricant under pressure to the inner circumference of said hollow cylindrical saw blades, and an oblong connecting member connecting all of said supporting means, with said connecting member extending in the direction of movement of the wooden body to be cut and carrying said common main lubricant duct.

18. The machine as claimed in claim 17, wherein said connecting member extends through the apertures of all of said hollow cylindrical saw blades and is provided with a longitudinal groove on its upper surface, with said common main lubricant duct being positioned in said groove.

19. The machine as claimed in claim 17, wherein said supporting means form a unitary structure with said connecting member, and said connecting member extends through the apertures of all of said hollow cylindrical saw blades.

20. The machine as claimed in claim 16, including a common carrier member extending in the direction of movement of the wooden body to be cut, said supporting means being connected to the common carrier member through the apertures of all of said hollow cylindrical saw blades, said lifting means being defined by threaded spindles located in the frame of the machine, an enlarged flange in said carrier member, said threaded spindles engaging threaded bores in the enlarged flange, and guide means on the enlarged flange by which said carrier member is guided in said frame when said carrier member is lifted.

21. The machine as claimed in claim 16, further comprising outer guide rollers for each belt, said outer guide rollers holding said belt in engagement with the lower circumference of the saw blade, pivotal arms for the outer guide rollers most remote from the vertical symmetrical plane of said saw blades, and the pivotal axes of said arms being outside the areas enclosed by said belt, and a spring loaded roller acting on the belt to stretch the belt whereby said most remote rollers are urged towards said saw blade by the belt tension.

22. The machine as claimed in claim 16, further comprising outer guide rollers for each belt, said outer guide rollers holding said belt in engagement with the lower circumference of the saw blade and pressing said saw blade against said friction reducing guide means, threaded spindles, and intermediate adjustable spring means operably associated with said outer guide rollers for radially adjusting said rollers with respect to the common axis of said saw blades.

23. The machine as claimed in claim 16, in which said stationary element entering the kerf in operation of the machine is defined by a kerf guide ledge fixed to said supporting means and which extends over a substantial part of the axial length of all supporting means except the first, viewed in the direction of movement of the wooden body to be cut, and the radius of said arc of a circle being equal to the radius of the first saw blade, viewed in the direction of movement of the wooden body to be cut.

24. The machine as claimed in claim 16, including saw blade cleaning devices for each saw blade resiliently engaging the inner and outer circumference of the saw blade, and each saw blade cleaning device being defined by a spring loaded plate provided with sharp edges engaging the inner and outer circumference of the saw blade.

References Cited by the Examiner

UNITED STATES PATENTS

| | | | |
|---|---|---|---|
| 157,703 | 12/74 | Stone | 143—16 |
| 259,661 | 7/82 | Bowker | 143—157.17 |
| 342,661 | 5/86 | Whitaker | 143—85 |
| 356,280 | 1/87 | Elder | 143—85 |
| 397,727 | 2/89 | King | 143—85 |
| 581,183 | 4/97 | Tope et al. | 143—85 |
| 651,652 | 6/00 | Davis. | |
| 1,421,204 | 6/22 | Fritz | 143—22 |
| 2,392,486 | 1/46 | Larsen | 143—85 X |
| 2,412,433 | 12/46 | Taylor | 143—133 X |
| 2,596,851 | 5/52 | Hansen. | |
| 2,751,941 | 6/56 | Smith | 143—85 |
| 2,753,899 | 7/56 | Murfin | 143—85 |
| 2,841,193 | 7/58 | Petrofsky | 143—85 |
| 3,060,779 | 10/62 | Taft | 143—16 X |

FOREIGN PATENTS

| | | |
|---|---|---|
| 313,037 | 6/19 | Germany. |
| 576 | 1877 | Great Britain. |
| 1,566 | 1860 | Great Britain. |

LESTER M. SWINGLE, *Primary Examiner.*

EARL EMSHWILLER, WILLIAM W. DYER, JR.,
*Examiners.*